(12) United States Patent
Kanehira

(10) Patent No.: US 6,763,867 B2
(45) Date of Patent: Jul. 20, 2004

(54) PNEUMATIC RADIAL TIRE WITH BELT COVER LAYER COMPRISING POLYOLEFIN KETONE FIBER CORDS

(75) Inventor: Yoshiki Kanehira, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 71 days.

(21) Appl. No.: 10/291,721

(22) Filed: Nov. 12, 2002

(65) Prior Publication Data
US 2003/0121583 A1 Jul. 3, 2003

(30) Foreign Application Priority Data
Nov. 12, 2001 (JP) ........................................ 2001-345854

(51) Int. Cl.⁷ .............................. B60C 9/00; B60C 9/20; B60C 9/22; D02G 3/48
(52) U.S. Cl. ........................ 152/527; 152/451; 152/531; 152/533; 428/394
(58) Field of Search ................................. 152/527, 531, 152/533, 451; 428/394; 57/243, 902

(56) References Cited

U.S. PATENT DOCUMENTS
2002/0017351 A1 * 2/2002 Miyazaki et al.

FOREIGN PATENT DOCUMENTS
| JP | 2000085315 A | * | 3/2000 |
| JP | 2000142025 A | * | 5/2000 |
| JP | 2001295134 A | * | 10/2001 |

* cited by examiner

Primary Examiner—Adrienne C. Johnstone
(74) Attorney, Agent, or Firm—Rader, Fishman & Grauer PLLC

(57) ABSTRACT

A pneumatic radial tire allowing to improve the high speed endurance and the road noise considerably. The pneumatic radial tire has a carcass layer mounted between a pair of right and left bead portions and a belt layer embedded in the outer peripheral side of the carcass layer in a tread portion, and a belt cover layer comprising fiber cords made of filaments of polyolefin ketone having a structure represented by the following formula (1) is disposed around the outer peripheral side of the belt layer, and an elongation rate of the fiber cords composing the belt cover layer is equal or inferior to 2.5% in the tire;

$$—(CH_2—CH_2—CO)n—(R—CO)m— \quad (1)$$

where, $1.05 \geq (n+m)/n \geq 1.00$,

R is an alkylene group having three or more carbons.

6 Claims, 1 Drawing Sheet

PNEUMATIC RADIAL TIRE WITH BELT COVER LAYER COMPRISING POLYOLEFIN KETONE FIBER CORDS

BACKGROUND OF THE INVENTION

The present invention concerns a pneumatic radial tire using fiber cords of polyolefin ketone for a belt cover layer and, more particularly a pneumatic radial tire for improving the high speed endurance and the road noise.

Along with the increase in quality and speed of recent vehicles, it is demanded to reduce the road noise during the travel and, furthermore, to improve the tire high speed endurance. In order to respond to such demands, it is proposed to use fiber cords of the polyolefin ketone presenting a predetermined strength and elastic modulus for the belt cover layer to be disposed around the outer peripheral side of the belt layer.

However, in the case of using the fiber cords of the polyolefin ketone for the belt cover layer, the elastic modulus provided by the fiber cord was not exploited sufficiently, and it was not satisfactory in terms of road noise improvement level. Namely, the polyolefin ketone fiber having a relatively low breaking elongation compared to nylon fiber or the like can hardly follow the lift deformation during the vulcanization. Consequently, the cord was broken or bitten easily, and it was impossible to maximize the elastic modulus of the fiber cord in a tire.

SUMMARY OF THE INVENTION

It is an object of the present invention to provide a pneumatic radial tire capable of improving the high speed endurance and the road noise considerably.

In order to achieve the aforementioned object, the pneumatic radial tire of the present invention is a pneumatic radial tire having a carcass layer mounted between a pair of right and left bead portions and a belt layer embedded in the outer peripheral side of the carcass layer in a tread portion, wherein a belt cover layer comprising the fiber cords made of the filaments of polyolefin ketone having a structure represented by the following formula (1) disposed around the outer peripheral side of the belt layer, and an elongation rate of the fiber cords composing the belt cover layer is equal or inferior to 2.5% in the tire.

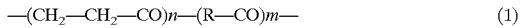
$$—(CH_2—CH_2—CO)n—(R—CO)m— \quad (1)$$

where, $1.05 \geq (n+m)/n \geq 1.00$,

R is an alkylene group having three or more carbons.

Thus, the disposition of the belt cover layer using fiber cords of polyolefin ketone satisfying specific conditions around the outer peripheral side of the belt layer, and the elongation rate of the fiber cords composing the belt cover layer made equal or inferior to 2.5% in the tire allow to deploy maximally the elastic modulus provided by the polyolefin ketone fiber cords, and thereby improve considerably the high speed endurance and the road noise compared to the prior art.

In the present invention, in order to obtain a sufficient effect improved in the high speed endurance and the road noise, the belt cover layer is the one where a ribbon material comprising at least one of the fiber cords arranged and coated with rubber is wound continuously at substantially 0° in respect to the tire circumferential direction and, preferably, strength of the fiber cords composing the belt cover layer is equal or inferior to 0.77 g/D (0.68 cN/dtex) when elongated by 1.0%, and an elastic modulus thereof is 50 to 170 g/D (44.1 to 150.0 cN/dtex) when elongated by 2.0%. On the other hand, a breaking elongation of the fiber cords composing the belt cover layer is preferably equal or superior to 4%. It should be appreciated that the aforementioned fiber cords are applicable not only to the belt cover layer but also to the belt layer.

In the present invention, though denier is used as thickness of the fiber cord, the denier can be converted into decitex based on the relation of 1D =1.111 dtex.

DETAILED DESCRIPTION OF THE PREFERRED EMBODIMENT

Figure 1:
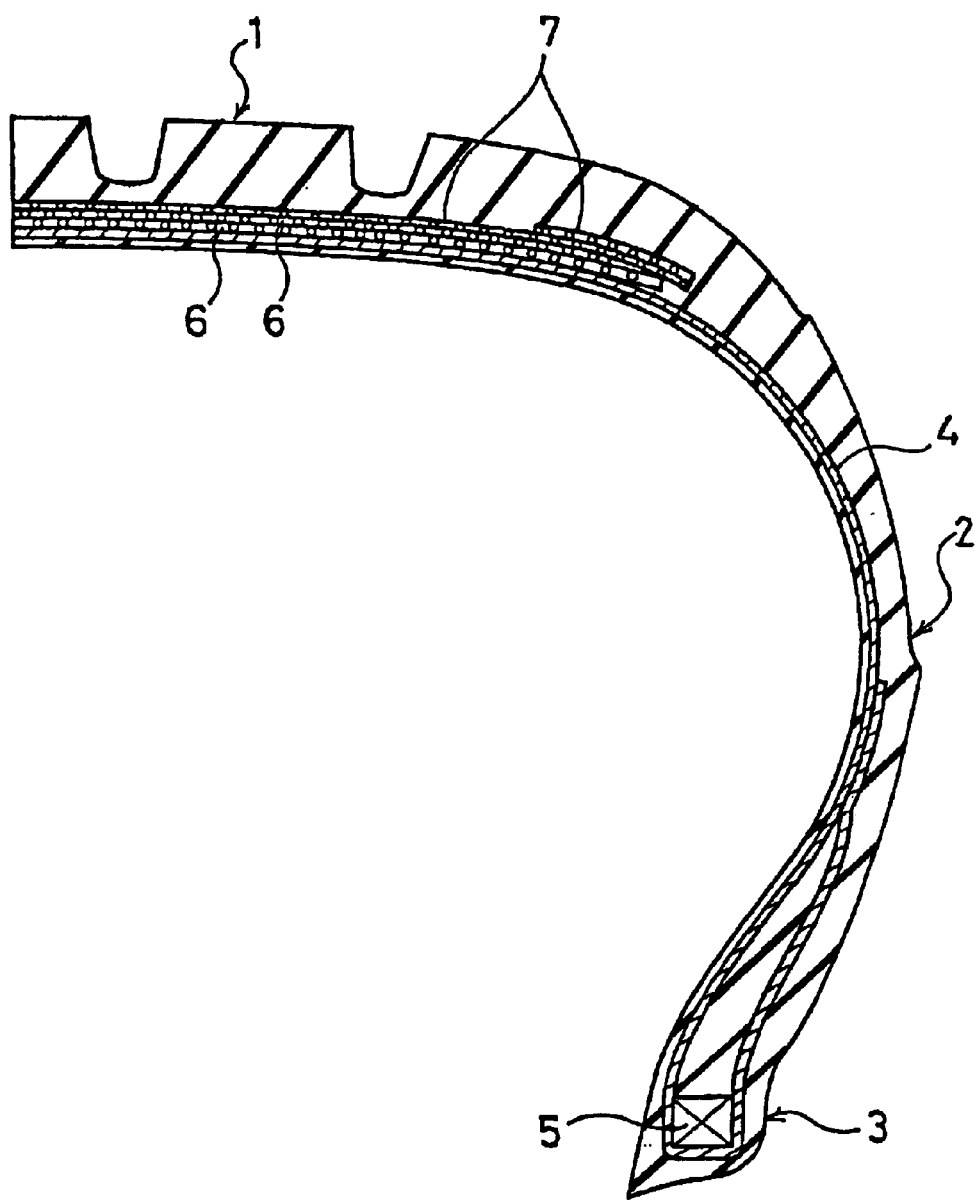
FIG. 1 is a half cross-sectional view showing a pneumatic radial tire made of an embodiment of the present invention.

Now, the composition of the present invention shall be described based on the accompanying drawing.

FIG. 1 shows the pneumatic radial tire according to an embodiment of the present invention, 1 indicates a tread portion, 2 a side wall portion and 3 a bead portion. A carcass layer 4 is mounted between a pair of right and left bead portions 3, 3 and an end portion of the carcass layer 4 is folded outward from the tire inside around a bead core 5. Several layers of belt layers 6, 6 are embedded in the outer peripheral side of the carcass layer 4 in the tread portion 1. These belt layers 6, 6 are disposed so that cords become slant in respect to the tire circumferential direction and cords cross each other between layers.

In the aforementioned pneumatic radial tire, a belt cover layer 7 made by orientating polyolefin ketone fiber cords to the tire circumferential direction is disposed around the outer peripheral side of the belt layer 6, 6. The belt cover layer 7 has preferably a Pointless structure where a ribbon material comprising at least one of the fiber cords arranged and coated with rubber is wound continuously at substantially 0° in respect to the tire circumferential direction. Moreover, the belt cover layer 7 is preferably made of a full cover covering the belt layers 6, 6 overall width and edge covers covering only both edges of the belt layers 6, 6.

Although the polyolefin ketone fiber can be obtained by melt spinning or wet spinning as disclosed Japanese patent application Kokai publication No. 1989-124617, Japanese patent application Kokai publication No. 1990-112413, U.S. Pat. No. 5,194,210, Japanese patent application Kokai publication No. 1997-324377, Japanese patent application Kokai publication No. 2001-115007, Japanese patent application Kokai publication No. 2001-131825 and so on; it is necessary to use a polyolefin ketone fiber having a structure represented by the following formula (1).

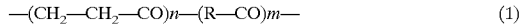
$$—(CH_2—CH_2—CO)n—(R—CO)m— \quad (1)$$

where, $1.05 \geq (n+m)/n \geq 1.00$,

R is an alkylene group having three or more carbons.

In the formula (1), if the fraction m (alkylene units other than ethylene) increases, the tire travel growth augments, lowering the endurance. This is considered to the alteration of crystalline structure of the spun fiber by the increase of m unit, which lowers the secondary bonding force between molecular chains. Moreover, if the strength of the fiber lowers, the strength drops further when it is made into a twist cord, therefore, it is necessary to increase the cord consumption in order to secure the tire destruction strength, making it difficult to supply a light and highly economical tire. Here, more preferably, an alternating copolymer comprising substantially only ethylene and carbon monoxide where m=0. It is preferable to use the wet spinning for manufacturing such fiber.

The elongation rate of the aforementioned polyolefin ketone fiber cord in the tire is equal or inferior to 2.5%, and more preferably, equal or inferior to 1.4%. If the elongation rate exceeds 2.5%, even when a polyolefin ketone fiber cord presents a large breaking elongation and a high modulus during a low elongation, the elastic modulus offered by the fiber cord can not be exploited sufficiently, and the effect improved in road noise can not be obtained.

The elongation rate of fiber cord in a tire can be determined as follows. Namely, the tire tread is peeled off and a mark is applied for indicating a span length X (for instance, 500 mm) in the cord longitudinal direction in a state where the belt cover layer is embedded. Thereafter, the cord of a portion corresponding to the span length X is taken out carefully, and the cord length X' as taken out is measured. Here, the elongation rate R can be determined from $R=(X-X')/X'$.

As for polyolefin ketone fiber cord, it is preferable to use a fiber cord presenting strength equal or inferior to 0.77 g/D when elongated by 1.0%, an elastic modulus of 50 to 170 g/D when elongated by 2.0%. If the strength exceeds 0.77 g/D when elongated by 1.0%, the fiber cord of the belt cover layer bits easily the belt layer, during the dilatation of the tire pushed by the bladder in the process of vulcanization, and as a result, the effect improved in high speed endurance can not be obtained. Moreover, if the elastic modulus is less than 50 g/D when elongated by 2.0%, the vibration of the belt layer can not be controlled sufficiently during the travel and, consequently, the effect improved in road noise can not be obtained, and on the contrary, if it exceeds 170g/D, the effect improved in high speed endurance can not be obtained.

The strength when elongated by 1.0% and the elastic modulus when elongated by 2.0% can be obtained as follows. Namely, the cord is tensed at a tension speed of 200 mm/min, and the stress-strain curve (S-S curve) is determined. Then, the strength and the elastic modulus (inclination) at a predetermined elongation are obtained from the aforementioned stress-strain curve.

For the aforementioned polyolefin ketone fiber cord, the breaking elongation is preferably equal or superior to 4%, and more preferably, equal or superior to 6%. If the breaking elongation is less than 4%, the high speed endurance becomes insufficient.

Moreover, for the aforementioned polyolefin ketone fiber cord, the twist multiplier K expressed by $K=T\sqrt{D}$ is preferably in a range from 1000 to 2500. Here, K is twist multiplier, T final twist number (times/10 cm) and D total denier number of the cord. If the twist multiplier K is less than 1000, not only it becomes difficult to secure the fatigue resistance, but also the breaking elongation lowers, deteriorating the injury-resistance. If the twist multiplier K exceeds 2500, the modulus drops considerably, making to difficult to secure the high speed endurance.

EXAMPLE

Supposing a tire size of 225/60R16 98HY390, in a pneumatic radial tire having the tire structure of FIG. 1, pneumatic radial tires of Examples 1 to 6 and Comparative Examples 1 to 4 are manufactured respectively, by differentiating variously the kind of fiber cord composing the belt cover layer, the elongation rate in the tire, the strength when elongated by 1.0, the elastic modulus when elongated by 2% and the breaking elongation as shown in Table 1. It should be noted that, as for fiber cord made of polyolefin ketone (POK), one of (n+m)/n=1.00 was used.

In Examples 1 to 4 and Comparative Examples 1 to 4, two belt layers are composed of steel cords, while in Examples 5 and 6, at least one belt layer is composed of POK fiber cords. For these belt layers, driving density of the steel cords [2+2(0.25)] is set to 40 cords/50 mm, while the driving density of POK fiber cords (1500D/2) to 50 cords/50 mm.

For these test tires, the high speed endurance and road noise are evaluated by the following method, and the results thereof are shown in Table 1.

High Speed Endurance:

A break-in travel is performed for 120 min with 88% of the load corresponding to the air pressure condition prescribed by JATMA, under the conditions of 210 kPa in test inner pressure and 81 km/h in velocity. Next, it is stood to cool for at least 3 hours, the air pressure is readjusted, the test is commenced from a velocity of 121 km/h, the velocity is increased gradually by 8 km/h every 30 min, and the travel is sustained until a failure occurs. The value expressing the distance until the occurrence of tire failure by an exponent taking the failure distance of the reference tire (Comparative Example 2) as 100 shall be considered as high speed endurance. Larger is the exponent value, more excellent is the high speed endurance.

Road Noise:

A microphone is installed at the ear position on a window side of a driver seat, and the sound pressure is measured during a steady travel at the velocity of 60 km/h on a rough road surface of a test course. The evaluation result is indicated by an exponent using the inverse number of the measured value and taking the reference tire (Comparative Example 2) as 100. A larger value of the exponent means a lower road noise.

TABLE 1

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Cord in belt cover layer | POK 1000D/2 50/50 mm | POK 1500D/2 40/50 mm | POK 1000D/2 50/50 mm | POK 1000D/2 50/50 mm | POK 1000D/2 50/50 mm | POK 1000D/2 50/50 mm | POK 1000D/2 50/50 mm | 66 nylon 840D/2 70/50 mm | PET 1500D/2 40/50 mm | Aramid 1500D/2 40/50 mm |
| Elongation rate (center) (%)  (edge) | 2.5 1.8 | 1.4 0.9 | 1.4 1.1 | 1.0 1.7 | 1.7 1.4 | 1.7 1.4 | 2.6 2.0 | 2.0 0.8 | 1.0 0.6 | 2.0 2.1 |
| Strength when elongated by 1% (g/D) [cN/dtex] | 0.62 [0.547] | 0.77 [0.68] | 0.70 [0.618] | 0.90 [0.794] | 0.70 [0.618] | 0.70 [0.618] | 0.49 [0.432] | 0.42 [0.370] | 0.70 [0.618] | 0.50 [0.441] |

TABLE 1-continued

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Elastic modulus when elongated by 2% (g/D) [cN/dtex] | 52 [45.9] | 168.5 [148.7] | 108 [95.3] | 175 [154.5] | 108 [95.3] | 108 [95.3] | 47 [41.5] | 22.4 [19.8] | 43 [38.0] | 268 [236.5] |
| Breaking elongation (%) | 7.0 | 5.5 | 6.2 | 3.8 | 6.2 | 6.2 | 8.0 | 15.6 | 12.3 | 6.5 |
| Belt structure (2B) | steel | steel | steel | steel | POK | POK | steel | steel | steel | steel |
| (1B) | steel | steel | steel | steel | steel | POK | steel | steel | steel | steel |
| Road noise | 105 | 115 | 110 | 112 | 104 | 105 | 103 | 100 | 103 | 112 |
| High speed endurance | 102 | 103 | 103 | 100 | 113 | 109 | 101 | 100 | 101 | 97 |

As obvious from the Table 1, compared with the Comparative Example 2, examples 1 to 3 were excellent in high speed endurance, and moreover, an effect improved considerably in road noise. In the Example 4, the effect improved considerably in road noise could be obtained, all the way sustaining the high speed endurance. For Examples 5 and 6, especially the effect improved in high speed endurance was remarkable. On the other hand, in the Comparative Example 1, though polyolefin ketone fiber cords are used for the belt cover layer, there was almost no effect improved in high speed endurance or road noise. Even in Comparative Examples 3 and 4 using other materials also, more excellent results than Examples 1 to 6 could not be obtained.

According to the present invention, in a pneumatic radial tire having a carcass layer mounted between a pair of right and left bead portions and a belt layer embedded in the outer peripheral side of the carcass layer in a tread portion, as a belt cover layer comprising fiber cords made of polyolefin ketone satisfying specific conditions is arranged on the outer peripheral side of the belt layer, the elastic modulus provided by the polyolefin ketone fiber cords can be exploited maximally, and the high speed endurance and road noise can be improved considerably.

Hereinabove, preferable embodiments of the present invention have been described in detail; however it should be understood that they can be modified, altered or substituted variously, without departing from the spirit and scope of the present invention defined in the attached claims.

What is claimed is:

1. A pneumatic radial tire having a carcass layer mounted between a pair of right and left bead portions and a belt layer embedded in the outer peripheral side of the carcass layer in a tread portion, wherein a belt cover layer comprising fiber cords made of filaments of polyolefin ketone having a structure represented by the following formula is disposed around the outer peripheral side of the belt layer, and an elongation rate of the fiber cords composing the belt cover layer is equal or inferior to 2.5% in the tire;

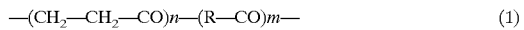

$$-(CH_2-CH_2-CO)n-(R-CO)m- \quad (1)$$

where, $1.05 \geq (n+m)/n \geq 1.00$,

R is an alkylene group having three or more carbons.

2. The pneumatic radial tire of claim 1, wherein a breaking elongation of the fiber cords composing the belt cover layer is equal or superior to 4%.

3. The pneumatic radial tire of claim 2, wherein the fiber cords made of the filaments of the polyolefin ketone are used for at least one belt layer.

4. The pneumatic radial tire of claim 1, wherein the belt cover layer is the one where a ribbon material comprising at least one of the fiber cords arranged and coated with rubber is wound continuously at substantially 0° in respect to the tire circumferential direction and, strength of the fiber cords composing the belt cover layer is equal or inferior to 0.77 g/D when elongated by 1.0%, and an elastic modulus thereof is 50 to 170 g/D when elongated by 2.0%.

5. The pneumatic radial tire of claim 4, wherein a breaking elongation of the fiber cords composing the belt cover layer is equal or superior to 4%.

6. The pneumatic radial tire of claim 5, wherein the fiber cords made of the filaments of the polyolefin ketone are used for at least one belt layer.

* * * * *